United States Patent
Ayoub et al.

(10) Patent No.: US 8,768,928 B2
(45) Date of Patent: *Jul. 1, 2014

(54) DOCUMENT OBJECT MODEL (DOM) BASED PAGE UNIQUENESS DETECTION

(75) Inventors: Khalil Ayoub, Kanata (CA); Hosam Aly, Kanata (CA); Jason Walsh, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,725

(22) Filed: Mar. 5, 2012

(65) Prior Publication Data

US 2012/0166936 A1    Jun. 28, 2012

Related U.S. Application Data

(63) Continuation of application No. 13/167,170, filed on Jun. 23, 2011, now Pat. No. 8,489,605.

(30) Foreign Application Priority Data

Jun. 30, 2010  (CA) ..................................... 2706743

(51) Int. Cl.
    *G06F 17/30*    (2006.01)
    *G06F 3/0482*    (2013.01)

(52) U.S. Cl.
    CPC ........ *G06F 17/30864* (2013.01); *G06F 3/0482* (2013.01)
    USPC ........... 707/737; 707/811; 715/234; 715/235; 715/704; 709/203; 709/217

(58) Field of Classification Search
    CPC ............ G06F 3/0482; G06F 17/30923; G06F 17/3086
    USPC .................. 707/737, E17.046, 709, 710, 811, 707/E17.116, E17.117, E17.118, E17.121, 707/E17.122, E17.126; 715/234, 235, 704, 715/760; 709/203, 217, 220, 223
See application file for complete search history.

(56) References Cited

U.S. PATENT DOCUMENTS 6,052,693 A * 4/2000 Smith et al. ........... 707/E17.058
6,392,568 B1 * 5/2002 Cooper .......................... 341/51

(Continued)

OTHER PUBLICATIONS

Ray Whitmer, Netscape/AOL—W3C—Document Object Model (DOM) level 3 XPath Specification, Version 1.0 W3C Working Draft Oct. 31, 2001.*

(Continued)

*Primary Examiner* — Pierre Vital
*Assistant Examiner* — Anh Ly
(74) *Attorney, Agent, or Firm* — Patents on Demand P.A.; Brian K. Buchheit; Scott M. Garrett

(57) ABSTRACT

DOM based unique ID generation, including receiving a hypertext markup language (HTML) page at a computer, and identifying HTML page elements in response to the receiving, the HTML page elements comprising parent nodes, the parent nodes comprising child nodes. The method further comprising processing each of the HTML page elements, the processing comprising: grouping the child nodes by parent node into a group of child nodes, detecting patterns in the group of child nodes in response to the grouping, reducing the group of child nodes to text strings in response to the detecting, storing the text strings as text values in the parent nodes, and generating a unique identifier (ID) of the HTML page in response to the processing.

20 Claims, 8 Drawing Sheets

(56) References Cited

U.S. PATENT DOCUMENTS

| | | | |
|---|---|---|---|
| 7,178,106 B2* | 2/2007 | Lamkin et al. | 715/716 |
| 7,444,345 B2* | 10/2008 | Meadows | 707/999.101 |
| 7,516,397 B2* | 4/2009 | Joshi et al. | 715/206 |
| 7,555,706 B2* | 6/2009 | Chapman et al. | 715/234 |
| 7,752,222 B1* | 7/2010 | Cierniak | 707/769 |
| 7,882,155 B2* | 2/2011 | Meadows | 707/811 |
| 7,984,388 B2* | 7/2011 | Dieberger et al. | 715/853 |
| 8,272,065 B2* | 9/2012 | Persson et al. | 726/27 |
| 2002/0023113 A1* | 2/2002 | Hsing et al. | 707/513 |
| 2002/0078144 A1* | 6/2002 | Lamkin et al. | 709/203 |
| 2002/0143659 A1* | 10/2002 | Keezer et al. | 705/27 |
| 2003/0084031 A1* | 5/2003 | Tarquini | 707/3 |
| 2003/0149934 A1* | 8/2003 | Worden | 715/513 |
| 2004/0021679 A1* | 2/2004 | Chapman et al. | 345/700 |
| 2004/0028049 A1* | 2/2004 | Wan | 370/394 |
| 2004/0158799 A1 | 8/2004 | Breuel | |
| 2004/0260676 A1 | 12/2004 | Douglis et al. | |
| 2005/0022115 A1* | 1/2005 | Baumgartner et al. | 715/513 |
| 2005/0267902 A1* | 12/2005 | Thurnhofer et al. | 707/100 |
| 2006/0020638 A1* | 1/2006 | Shadmon | 707/200 |
| 2006/0225001 A1* | 10/2006 | Sylthe et al. | 715/864 |
| 2006/0271850 A1* | 11/2006 | Gombert et al. | 715/523 |
| 2007/0204218 A1* | 8/2007 | Weber et al. | 715/530 |
| 2007/0260706 A1* | 11/2007 | Skingle | 709/217 |
| 2008/0033996 A1* | 2/2008 | Kesari | 707/104.1 |
| 2008/0040345 A1* | 2/2008 | Cameron | 707/6 |
| 2008/0052369 A1* | 2/2008 | Weber et al. | 709/217 |
| 2008/0052372 A1* | 2/2008 | Weber et al. | 709/217 |
| 2008/0139191 A1* | 6/2008 | Melnyk et al. | 455/419 |
| 2008/0263026 A1 | 10/2008 | Sasturkar et al. | |
| 2008/0288530 A1* | 11/2008 | Flam et al. | 707/102 |
| 2008/0320075 A1* | 12/2008 | Livshits et al. | 709/203 |
| 2009/0049062 A1 | 2/2009 | Chitrapura et al. | |
| 2009/0099919 A1* | 4/2009 | Schultheiss et al. | 705/14 |
| 2009/0248707 A1* | 10/2009 | Mehta et al. | 707/100 |
| 2009/0292791 A1* | 11/2009 | Livshits et al. | 709/217 |
| 2009/0300056 A1 | 12/2009 | Fu et al. | |
| 2009/0300764 A1* | 12/2009 | Freeman | 726/24 |
| 2010/0005058 A1* | 1/2010 | Tago et al. | 707/2 |
| 2010/0049766 A1* | 2/2010 | Sweeney et al. | 707/737 |
| 2010/0094859 A1* | 4/2010 | Gupta | 707/709 |
| 2010/0287467 A1* | 11/2010 | Sylthe et al. | 715/273 |
| 2011/0066676 A1* | 3/2011 | Kleyzit et al. | 709/203 |
| 2011/0239104 A1* | 9/2011 | Prasad et al. | 715/234 |
| 2012/0233241 A1* | 9/2012 | Dickens et al. | 709/203 |

OTHER PUBLICATIONS

Jan-Marco Bremer and Michael Gertz—"Integrating document and data retrieval based on XML" —The VLDB Journal—vol. 15, Issue 1, Jan. 2006 (pp. 53-83).*

Lakshmish Ramaswamy, et al., "Automatic Detection of Fragments in Dynamically Generated Web Pages", Proceedings of the 13th Conference on World Wide Web, WWW 2004, May 17, 2004, p. 443, XP55002984, New York, New York, USA.

Zhang, Y. et al., Algorithm of Web Page Purification Based on Improved DOM and Statistical Learning, Proceedings of the 2010 International Conference on Computer Design and Applications, ICCDA 2010, Qinhuangdao, China, Jun. 25-27, 2010, vol. 5 pp. 288-V5-291.

* cited by examiner

DOCUMENT OBJECT MODEL (DOM) BASED PAGE UNIQUENESS DETECTION

CROSS REFERENCE TO RELATED APPLICATIONS

This application claims priority of Canadian Patent Application Serial No. 2706743 entitled "DOM Based Page Uniqueness Detection", filed on Jun. 30, 2010. This application is a continuation of U.S. patent application Ser. No. 13/167,170, filed Jun. 23, 2011 (pending), which is incorporated herein in its entirety.

BACKGROUND

This invention relates generally to processing within a computing environment, and more particularly to Document Object Model (DOM) based page uniqueness detection.

Web Crawlers, such as those used by page indexing search engines, and security scanning applications often need to determine if a page has already been visited. To do this, those applications attempt to identify a page as unique using information on the page. This information is used to determine if the next page being visited is a new page or a duplicate of one visited previously. Web Crawlers and security scanning applications must use techniques in order to prevent them from entering an infinite loop (i.e. exploring a series of pages over and over again) while ensuring that the relevant pages of the website are indexed. These applications may use key elements of the page in order to determine the uniqueness of the page. They may use, for example, the Uniform Resource Locator (URL) of the page, the parameters passed to the page and cookies (i.e. information stored on a browser from a web server), etc. in order to uniquely identify the page. This process will assist in avoiding creating an infinite loop. One problem with this type of implementation is that it often makes it impossible to crawl Web 2.0 applications. Web 2.0 applications make extensive use of JavaScript and XmlHttpRequest which may modify page content without changing the URL, parameters, or cookies of the page thereby making identifying a page more difficult.

BRIEF SUMMARY

Embodiments of the disclosure include methods for page based unique ID generation, the methods comprising receiving a hypertext markup language (HTML) page at a computer, and identifying HTML page elements in response to the receiving, the HTML page elements comprising parent nodes, the parent nodes comprising child nodes. The method further comprising processing each of the HTML page elements, the processing comprising: grouping the child nodes by parent node into a group of child nodes, detecting patterns in the group of child nodes in response to the grouping, reducing the group of child nodes to text strings in response to the detecting, storing the text strings as text values in the parent nodes, and generating a unique identifier (ID) of the HTML page in response to the processing.

Additional embodiments include systems for page based unique ID generation, the system comprising a host system in communication with at least one client system over a network, a page based unique ID generation application for execution on the host system, the page based for unique ID generation application including logic for implementing a method comprising receiving a hypertext markup language (HTML) page at a computer, and identifying HTML page elements in response to the receiving, the HTML page elements comprising parent nodes, the parent nodes comprising child nodes. The system further comprising processing each of the HTML page elements, the processing comprising: grouping the child nodes by parent node into a group of child nodes; detecting patterns in the group of child nodes in response to the grouping; reducing the group of child nodes to text strings in response to the detecting; and storing the text strings as text values in the parent nodes; and generating a unique identifier (ID) of the HTML page in response to the processing.

Further embodiments include computer program products comprising a non-transitory storage medium storing instructions, which when executed by a computer implement page based unique ID generation, the computer program product implementing a method, the method comprising receiving a hypertext markup language (HTML) page at a computer, and identifying HTML page elements in response to the receiving, the HTML page elements comprising parent nodes, the parent nodes comprising child nodes. The method further comprising processing each of the HTML page elements, the processing comprising grouping the child nodes by parent node into a group of child nodes, detecting patterns in the group of child nodes in response to the grouping, reducing the group of child nodes to text strings in response to the detecting, and storing the text strings as text values in the parent nodes. The method further comprising generating a unique identifier (ID) of the HTML page in response to the processing.

Yet other embodiments include an apparatus for implementing page based unique ID generation, the apparatus comprising web indexing application logic communicatively coupled to a computer processor and configured to receive a hypertext markup language (HTML) page at a computer, identify HTML page elements in response to the receiving, the HTML page elements comprising parent nodes, the parent nodes comprising child nodes, and process each of the HTML page elements. The processing comprising grouping the child nodes by parent node into a group of child nodes, detecting patterns in the group of child nodes in response to the grouping, reducing the group of child nodes to text strings in response to the detecting, and storing the text strings as text values in the parent nodes. The web indexing application logic further configured to generate a unique identifier (ID) of the HTML page in response to the processing.

Additional features and advantages are realized through the techniques of the disclosure. Other embodiments and aspects of the disclosure are described in detail herein and are considered within scope of the disclosure. For a better understanding of the invention with advantages and features, refer to the description and to the drawings.

DETAILED DESCRIPTION

Figure 1:
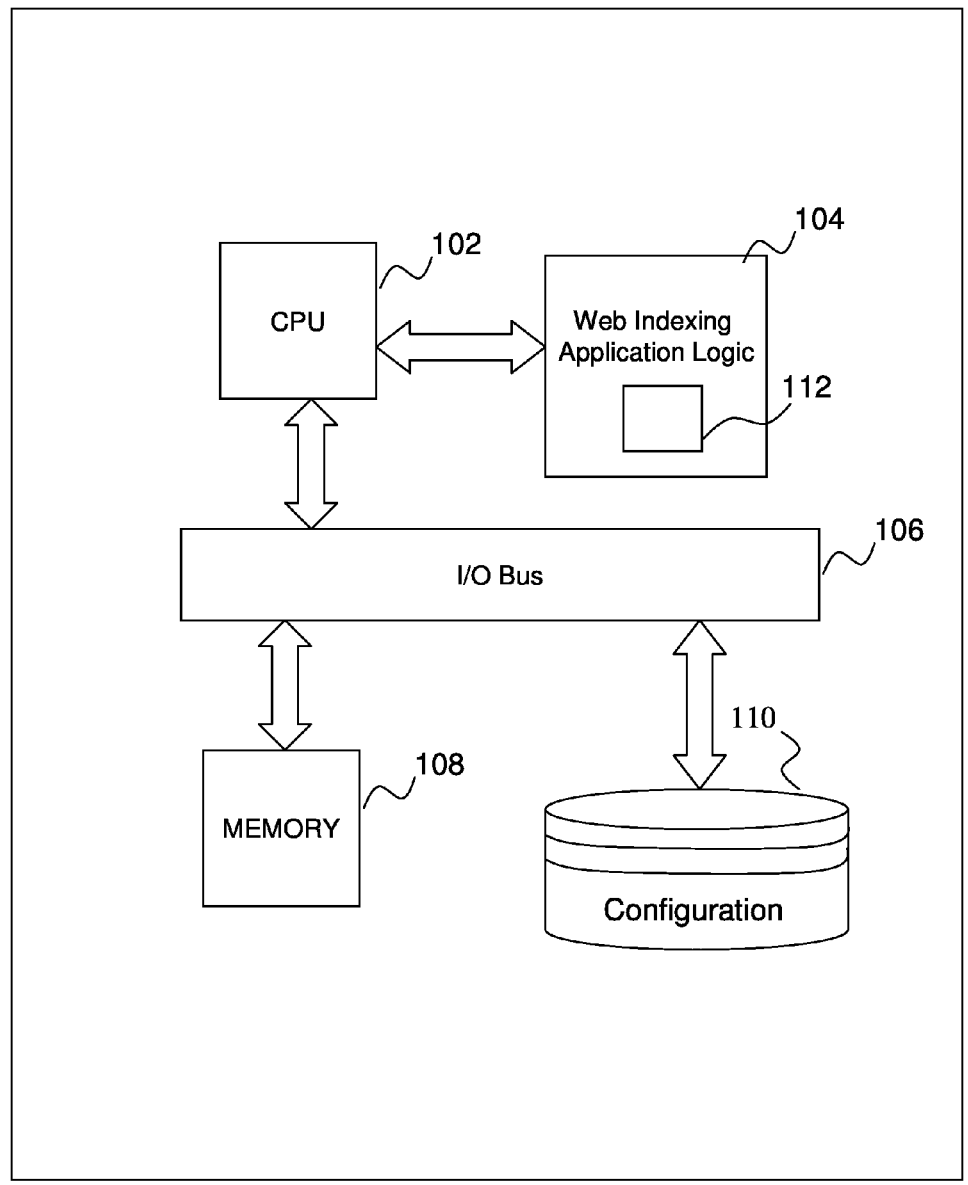
FIG. 1 depicts a block diagram of a computer system that may be implemented by an embodiment of the disclosure.

Web Crawlers are used to search and index pages on the Internet. Security scanning applications crawl pages as well. When either discovers a page that they have not visited, they scan the page for security vulnerabilities, such as cross site scripting, or SQL injection vulnerabilities. Web crawlers and security applications index pages in order to determine if they have already visited the page. Methods of indexing pages include using common page identifiers such as page Uniform Resource Locators (URLs) of the web pages (i.e. the address of the web page), parameters passed to the web page (e.g. form parameters submitted to the server), or cookies (i.e. information passed from the webserver to a browser for storage and retrieval). For static web pages, such as standard Hyper Text Markup Language (HTML) pages, these parameters may sufficiently identify pages.

However, with the advent of Web 2.0 applications (i.e. software applications with dynamic functions written in HTML) and the increased uses of javascript, including XmlHttpRequests, the URLs, parameter, cookies, or even the content of the page may not be enough to uniquely identify them. Javascript is a programming language used for scripting on the client side browser. Standard HTML may be generated dynamically by a webserver, however once the browser receives the HTML page generated by the webserver, its content becomes static. Javascript allows a properly coded HTML page to be modified by a web browser after being sent from the webserver. Javascript includes a series of functions and properties standardized by the World Wide Web Consortium (W3C) and implemented by web browser developers. One such Javascript command is the XmlHttpRequest command. The XmlHttpRequest command allows a web browser to make additional requests of the webserver, in the background, after the web page has been loaded. Using other Javascript commands the web browser can modify the content of the page based on the new content received as a result of the XmlHttpRequest command, user input through a keyboard and/or mouse, timers, or any combination of these methods. As a result of the possible way that a page can change, the prior methods of searching and indexing pages breaks down.

For example, a page using the same URL, parameters, and cookies may contain very different content over time even without user intervention. In addition, two pages with different URLs may have identical content. Furthermore, two pages may share the same content but different layouts based on user preferences or user manipulation. Therefore, the typical methods of using URLs, parameters, cookies and content can result in duplicate pages being indexed separately, the different pages being indexed as the same, and the same pages with different layouts to be indexed as two different pages.

Document Object Model (DOM) based page uniqueness (DOMBPU), offers another method of identifying a unique page, which will identify new pages within Web 2.0 and AJAX web sites. DOMBPU process pages as a human would look at it in order to determine that the page is in fact a new page. For example, a human would look at a page and see each of the elements on the page and be able to determine that it is a new page, or that the page is the same page but with different elements in the page. Web crawlers have difficulty making that distinction. DOMBPU looks at the key elements of the page, the HTML, in order to determine what a person sees. People know when they are looking at a list if it is a menu, for example, or a list of items. A person would not think the page has changed simply because the menu has another item in it, or a list has been filtered slightly. DOMBPU will attempt to determine which parts of a page are lists, identify the different sections of a page, and determine a unique identifier for the page. If another page is found with the same unique identifier, DOMBPU will know that the page is the same merely with some different items in the page.

DOM based page uniqueness detection works by reducing all of the elements on a page to a single functional item. The reduction is repeatable and may be configured to create the same functional item based on a page with varying layouts.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to FIG. 1, a system 100 for implementing DOM based page uniqueness detection will now be described. In an embodiment, the system 100 includes a computer processing unit (CPU) 102 executing computer instructions for DOM based page uniqueness detection. The CPU 102 is communicatively coupled to an I/O bus 106 for communicating with I/O systems such as memory 108 and a storage device 110. The memory 108 is communicatively coupled to the I/O bus 106 and may be any memory capable of high-speed storage and retrieval of data as is known in the art. The storage device 110 is communicatively coupled to the I/O bus 106 and may be any storage device capable of storing data such as a magnetic storage disk, non-volatile solid-state drive, or any other device capable of storing data as is known in the art. The CPU 102 is also communicatively coupled to web indexing application logic 104. The web indexing application logic 104 executes a web indexing application 112 for providing web indexing application 112 services as will be described in more detail below.

It will be understood that the DOM based page uniqueness detection system 100 described in FIG. 1 may be implemented in hardware, software, or a combination thereof.

Figure 2:
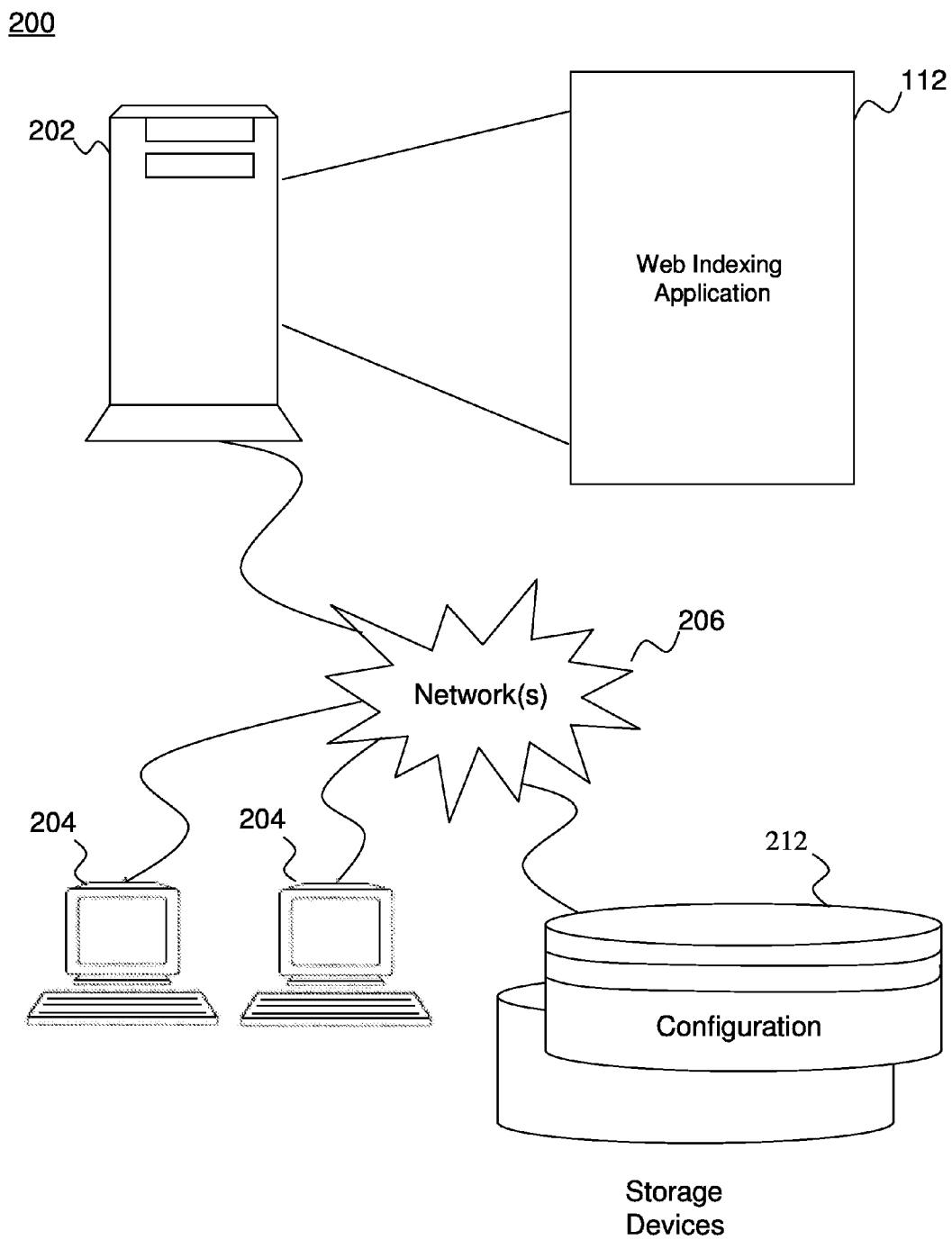
FIG. 2 depicts a block diagram of a data processing system that may be implemented by an embodiment of the disclosure.

Turning now to FIG. 2, an additional system 200 for implementing DOM based page uniqueness detection will now be described. In an embodiment, the system 200 includes a host system 202 executing computer instructions for DOM based page uniqueness detection. Host system 202 may operate in any type of environment that is capable of executing a software application. Host system 202 may comprise a high-speed computer-processing device, such as a mainframe computer, to manage the volume of operations governed by an entity for which the DOM based page uniqueness detection is executing. In an embodiment, the host system 202 is part of an enterprise (e.g., a commercial business) that implements the DOM based page uniqueness detection.

In an embodiment, the system 200 depicted in FIG. 2 includes one or more client systems 204 through which users at one or more geographic locations may contact the host system 202. The client systems 204 are coupled to the host system 202 via one or more networks 206. Each client system 204 may be implemented using a general-purpose computer executing a computer program for carrying out the processes described herein. The client systems 204 may be personal computers (e.g., a lap top, a personal digital assistant) or host attached terminals. If the client systems 204 are personal computers, the processing described herein may be shared by a client system 204 and the host system 202 (e.g., by providing an applet to the client system 204). Client systems 204 may be operated by authorized users (e.g., programmers) of the DOM based page uniqueness detection described herein.

The networks 206 may be any type of known network including, but not limited to, a wide area network (WAN), a local area network (LAN), a global network (e.g., Internet), a virtual private network (VPN), and an intranet. The networks 206 may be implemented using a wireless network or any kind of physical network implementation known in the art. A client system 204 may be coupled to the host system 202 through multiple networks (e.g., intranet and Internet) so that not all client systems 204 are coupled to the host system 202 through the same network. One or more of the client systems 204 and the host system 202 may be connected to the networks 206 in a wireless fashion. In one embodiment, the networks 26 include an intranet and one or more client systems 204 execute a user interface application (e.g., a web browser) to contact the host system 202 through the networks 206. In another embodiment, the client system 204 is connected directly (i.e., not through the networks 206) to the host system 202 and the host system 202 contains memory for storing data in support of DOM based page uniqueness detection. Alternatively, a separate storage device (e.g., storage device 212) may be implemented for this purpose.

The DOM based page uniqueness detection storage device (storage device) 212 includes a data repository with data relating to DOM based page uniqueness detection by the system 200, as well as other data/information desired by the entity representing the host system 202 of FIG. 2. The storage device 212 is logically addressable as a consolidated data source across a distributed environment that includes networks 206. Information stored in the storage device 212 may be retrieved and manipulated via the host system 202 and/or the client systems 204. The data repository includes one or more databases containing, for example, corresponding configuration parameters, values, methods, and properties, as well as other related information. It will be understood by those of ordinary skill in the art that the data repository may also comprise other structures, such as an XML file on the file system or distributed over a network (e.g., one of networks 206), or from a data stream from another server (not shown)

located on a network. In addition, the storage device 212 may alternatively be located on a client system 204.

The host system 202 depicted in the system 200 of FIG. 2 may be implemented using one or more servers operating in response to a computer program stored in a storage medium accessible by the server. The host system 202 may operate as a network server (e.g., a web server) to communicate with the client systems 204. The host system 202 handles sending and receiving information to and from the client systems 204 and can perform associated tasks. The host system 202 may also include a firewall to prevent unauthorized access to the host system 202 and enforce any limitations on authorized access. For instance, an administrator may have access to the entire system and have authority to modify portions of the system. A firewall may be implemented using conventional hardware and/or software as is known in the art.

The host system 202 may also operate as an application server. The host system 202 executes one or more computer programs to provide the DOM based page uniqueness detection. Host system 202 includes the web indexing application 112 for DOM based page uniqueness detection as will be described in more detail below.

As indicated above, processing may be shared by the client systems 204 and the host system 202 by providing an application (e.g., java applet) to the client systems 204. Alternatively, the client system 204 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

It will be understood that the DOM based page uniqueness detection system 200 described in FIG. 2 may be implemented in hardware, software, or a combination thereof.

Figure 3:
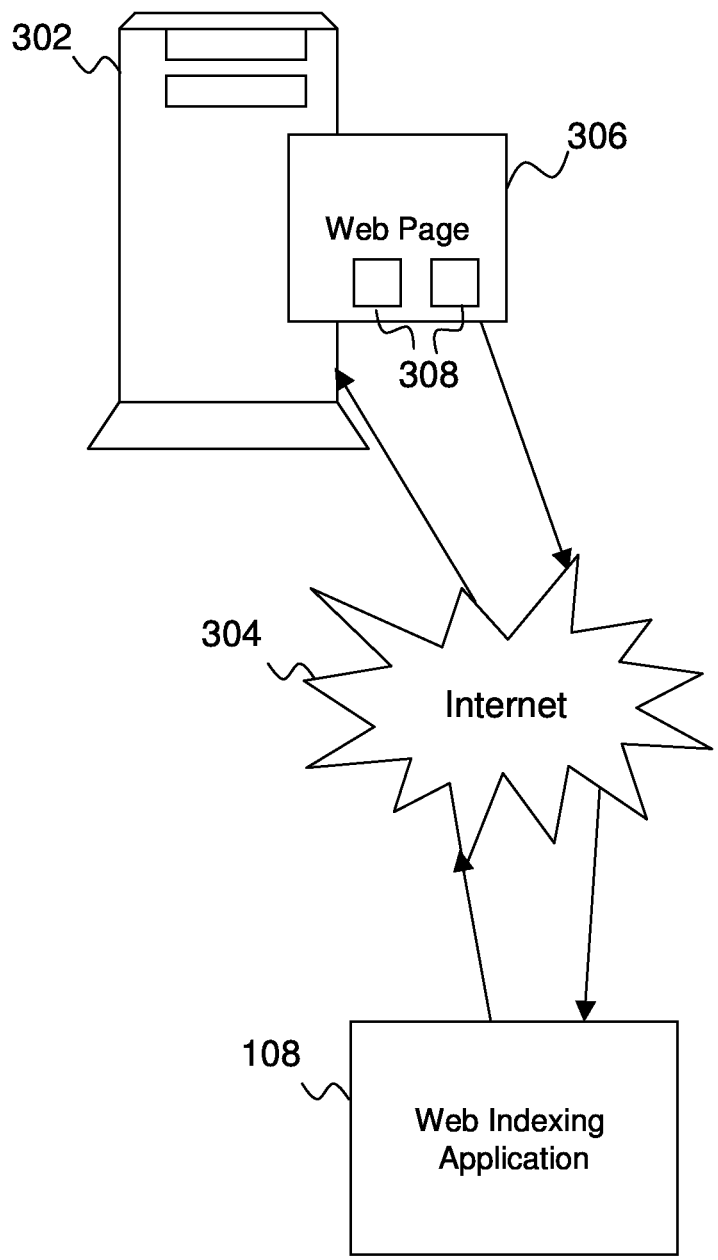
FIG. 3 depicts a block diagram of a client/server network environment that may be implemented by an embodiment of the disclosure.

FIG. 3 is a block diagram of an embodiment of the web indexing application 112 executing on the host system 202 of FIG. 2 or the web indexing application logic 104 of FIG. 1 operating over a network 206. The web indexing application 112 is communicatively coupled to a network such the Internet 304 as described above. The web indexing application 112 sends page requests over the Internet 304 to a webserver 302. The webserver 302 receives the page request and returns a web page 306 to the web indexing application 112 over the Internet 304. The webserver 302 generates the web page 306 from content retrieved from other servers or data stores (not shown) serves the web page 306 from its local data store (not shown) or from a local datastore (not shown). The web page 306 includes page elements 308.

Page elements 308 are fragments of HTML (also referred to herein as nodes) that give structure to the web page 306. Some examples of page elements 308 are HTML tables (i.e. a TABLE node). An HTML table organizes data in rows (designated by a TR node) and columns (designated by a TD node). TR nodes are nested within TABLE nodes and TD nodes are nested within TR nodes. Other examples of nodes are DIV nodes which organize data in blocks, <P> nodes which organize text into paragraphs, the anchor node (A node) which indicates a link, and an image node (IMG node) which indicates an image. In addition to organization page elements 308 also provide mechanisms for interactivity (i.e. a SCRIPT node) and formatting (i.e. a STYLE node). These HTML nodes are nested within each other and share a single root page element called HTML. One such example is listed in Table 1.

TABLE 1

```
<html>
    <head>
        <title>News Site</title>
    <head>
    <body>
        <table>
            <tr onmouseover="..." onmouseout="..." onkeyup="" id="...">
                <td>
                    <table class="..." cellpadding="..." cellspacing="...">
                        <tr>
                            <td style="...">
                                <a class="..." href="" style="...">
                                    <span id="menu">Menu Item 1</span>
                                </a>
                            </td>
                        </tr>
                    </table>
                </td>
            </tr>
        </table>
    </body>
</html>
```

The HTML nodes are arranged in a tree structure with the parent node containing child nodes. Turning to Table 1, the HTML node is the root element as stated above. It serves as the parent node for the head and body nodes. In that example, the head and body nodes are child nodes to the HTML node. The head and body nodes may be parent nodes to their child nodes. Turning back to Table 1, the head node is the parent node to the title node, which is a child node of the head node. The title node has no child nodes and is therefore considered a leaf node. In the example in Table 1, both the title and the span nodes are leaf nodes. Each node may contain attributes and text. The span node of Table 1, for example, contains an attribute id with a value of "menu." The span node also contains the text "Menu Item 1." Table 1 is one example embodiment of an HTML page, HTML pages may contain any number of additional elements and attributes and other markup as is known in the art, the embodiment is not meant to be limiting.

Figure 4:
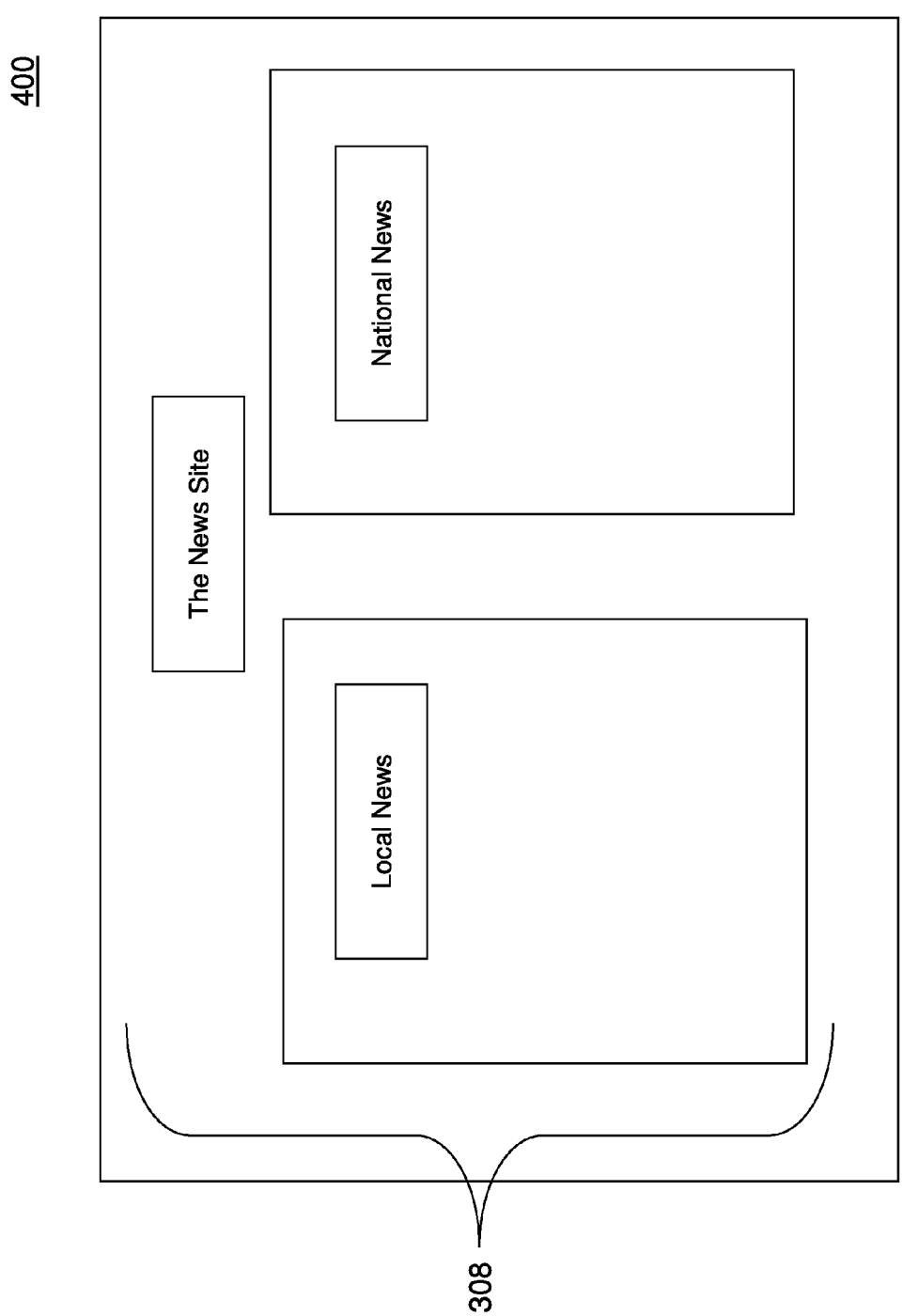
FIG. 4 depicts a web page that may be processed by an embodiment of the disclosure.
Figure 5:
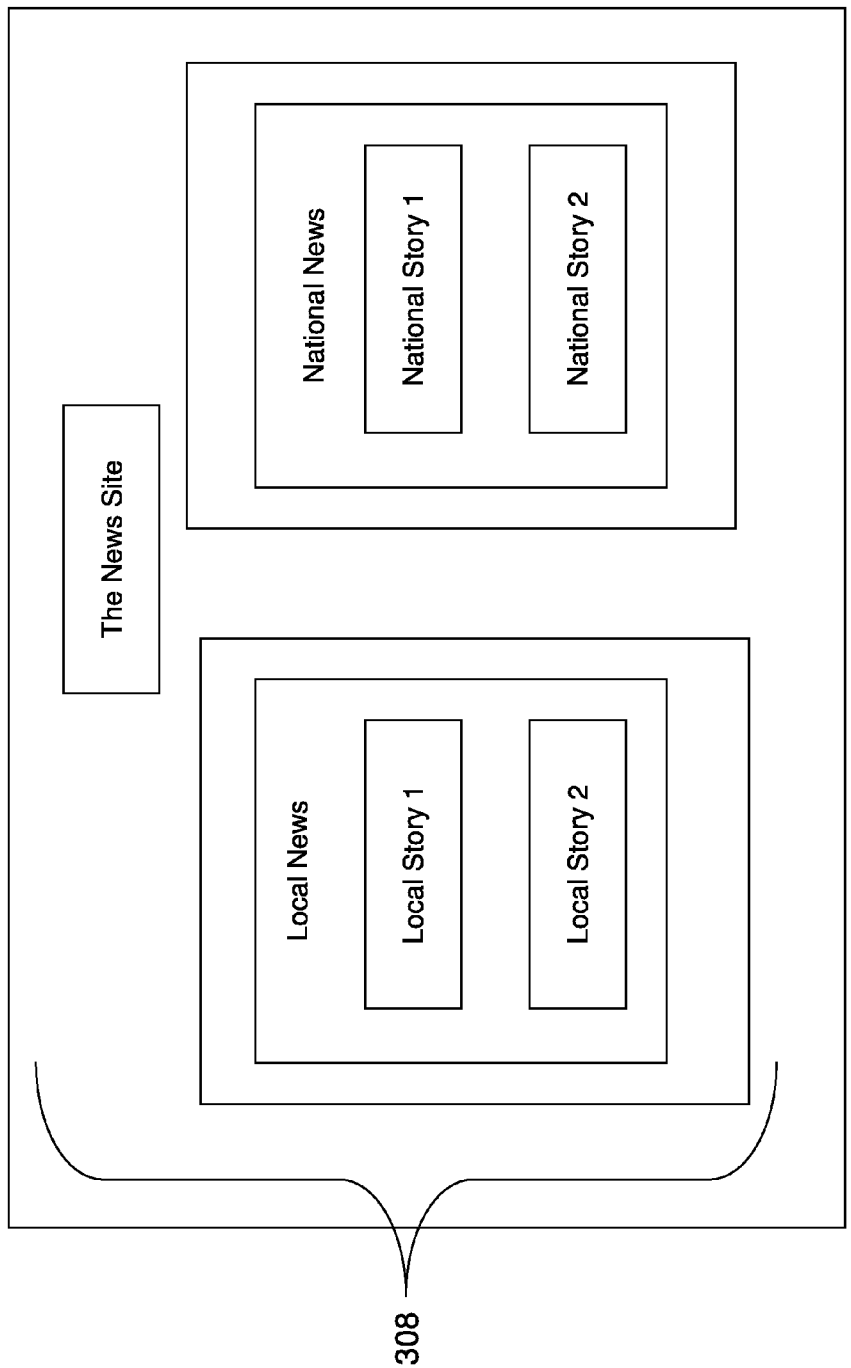
FIG. 5 depicts an additional web page that may be processed by an embodiment of the disclosure.
Figure 6:
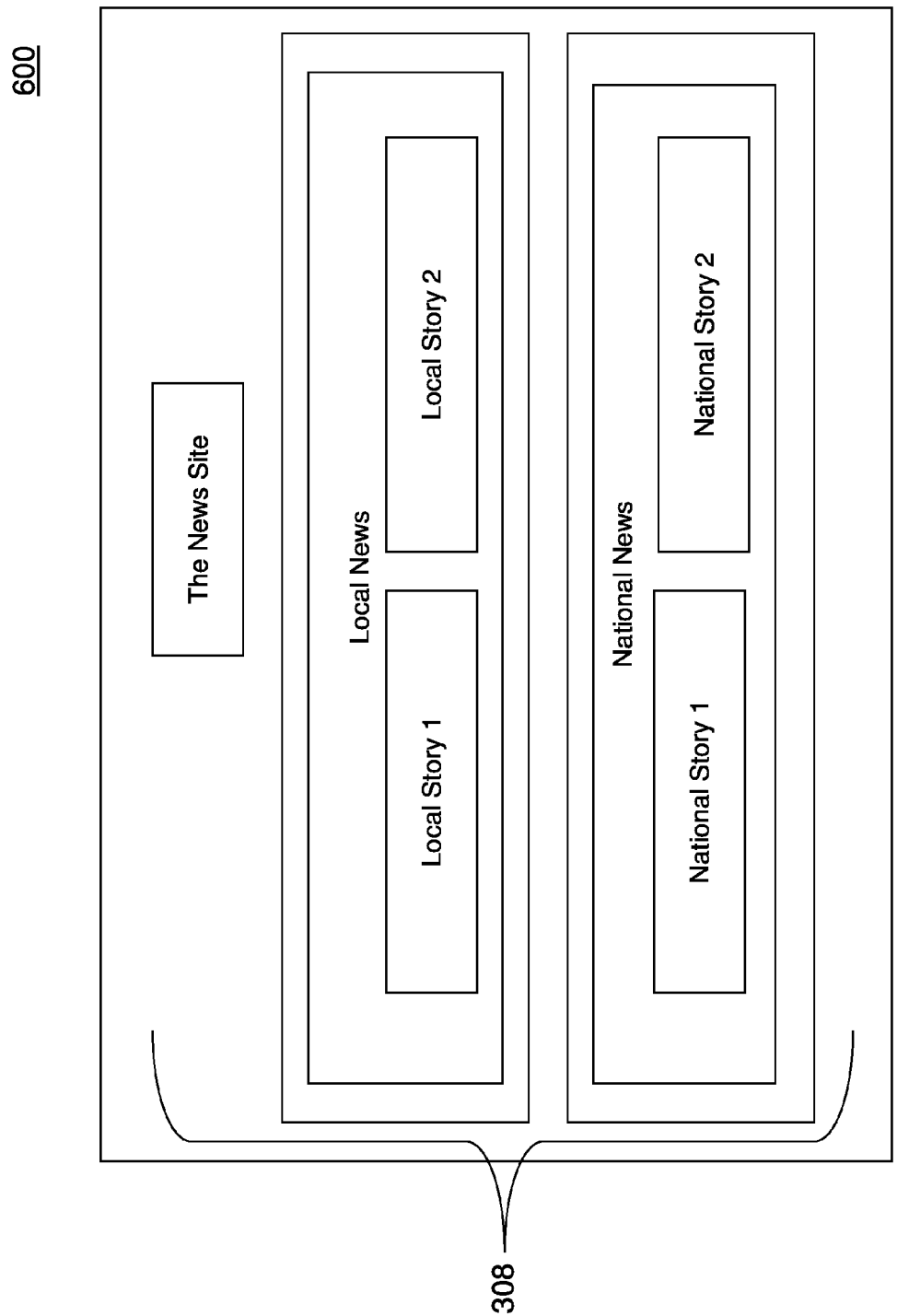
FIG. 6 depicts an additional version of a web page that may be processed by an embodiment of the disclosure.

Web 2.0 web pages 306 may also be modified with subsequent XmlHttpRequests. In an embodiment the web indexing application 112, detects one or more SCRIPT nodes, or associated javascript files as is known in the art, with one or more XmlHttpRequest commands. The web indexing application 112 may then execute each of the XmlHttpRequest commands and, using other commands from the SCRIPT node, or an associated javascript file as is known in the art, reformats the web page 306 so that it matches the configuration it would have taken in a web browser. FIG. 4 depicts a web page 400 before the XMLHttpRequests were executed, and FIG. 5 depicts the same web page 500 once all of the XmlHttpRequests have been executed by the web indexing application 112. Although both web pages 400 and 500 share the same url, parameters, and cookies, the page elements 308 are different. FIG. 6 depicts a web page 600 with the same page elements 308 as web page 500, but with the page elements 308 in a different layout. The page elements 308 of web pages 400 and 500 are movable HTML page elements. The page elements 308 can be moved around the web pages 400 and 500 by a user of the web pages 400 and 500 or by configuration settings on, for example, the webserver 302. Although the web pages 400 and 500 have the same page elements 308, they are ordered differently. Based on configuration settings, the web indexing application 112 may determine that these are the same pages and generate the same ID for each of them. Although the network has been described herein as the Internet 304, it will be understood that in additional embodiments of the present invention the web indexing application 112 requests pages from a server over an Intranet (not shown) or other suitable network as is known in the art.

Figure 7:
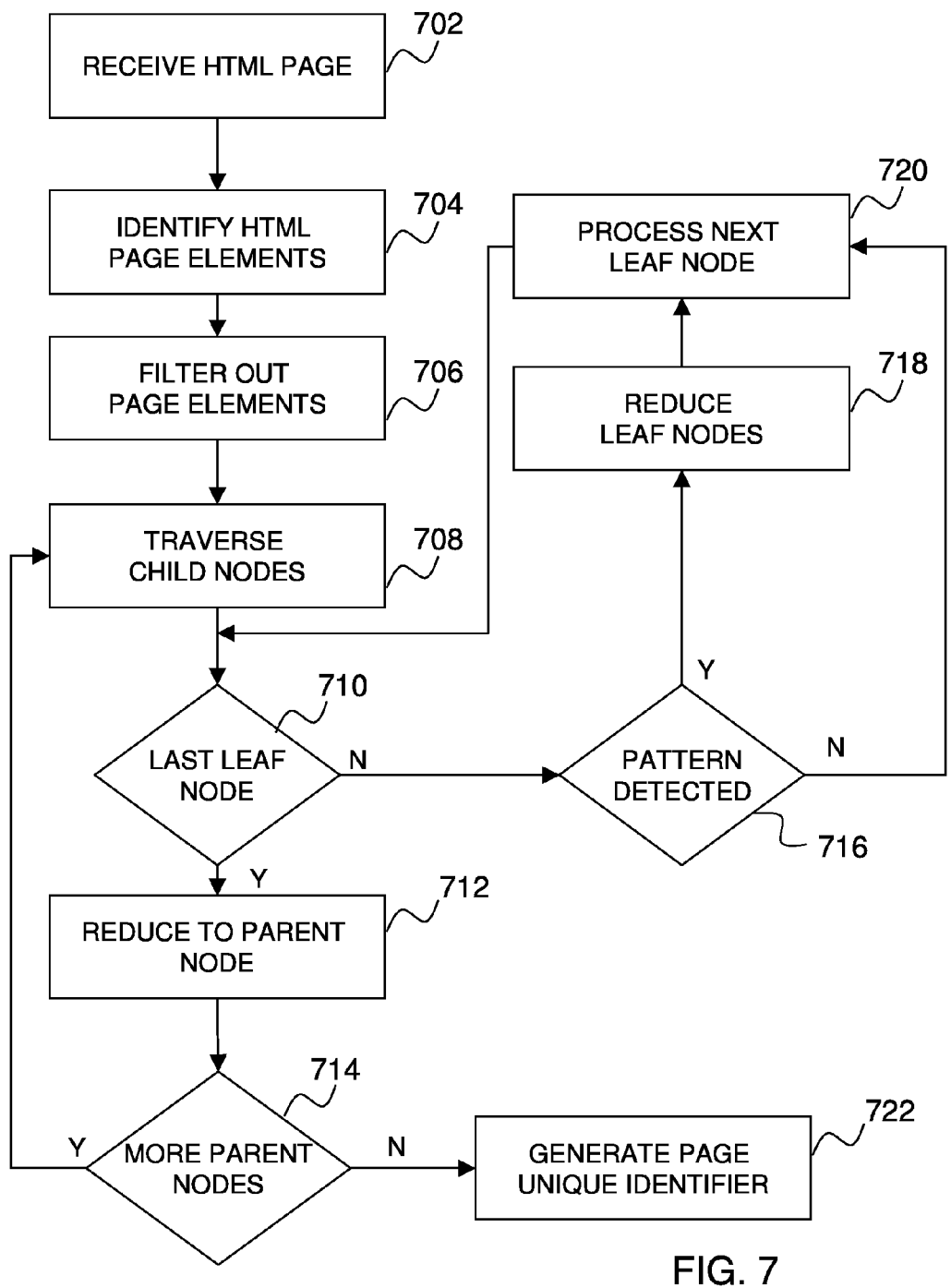
FIG. 7 depicts a detailed block diagram of an embodiment of the disclosure.

FIG. 7 depicts a process flow that may implement by the web indexing application 112 executing on the host system 202 or web indexing application logic 104 in an embodiment of the current invention. At block 702 the web indexing application 112 receives an HTML page from the webserver 302 of FIG. 2. The HTML page may be in the form of a static HTML page, or a Web 2.0 HTML page (e.g. FIGS. 4-6) with embedded Javascript. At block 704 the HTML is parsed (i.e. the HTML page elements 308 are read and interpreted) and all of the page elements 308 are identified and stored in memory while retaining their original layout and order. At block 706 the page elements 308 which are not significant are filtered out. In an embodiment the filtered page elements 308 are removed from memory. In alternate embodiments the filtered page elements are left in memory but ignored in future processing steps.

The elements to be filtered are configured by configuration settings (also referred to herein as filter criteria) stored in the storage device 110 and/or 212 as filters. In an embodiment the filters comprise a list of HTML nodes (e.g. img, a) that are to be filtered. In one embodiment, a series of filters may be used to exclude some elements while including others. For example, a filter may be configured to eliminate all <li> nodes while a second filter may be created to include all <li> nodes which contain an attribute "important." By using both exclusive filters and inclusive filters all <li> nodes may be excluded except for <li> nodes with the attribute of "important." The filters may comprise a list of element names, and/or one or more XML Path Language (XPath) instructions. The XPath instructions comprise one or more strings of instructions indicating a particular HTML node by node name, attribute name, attribute value, or HTML element value including display text within the HTML page. The XPath command may be used to explicitly exclude particular segments of the HTML as is known in the art. In addition, the filters may comprise regular expression (regex) instructions as is known in the art. Regex instruction provide the text parsing and filtering capabilities which may be used to filter the HTML page by text and/or wildcard strings as is known in the art. Of course any other method of identifying elements to be excluded or included as is known in the art may be used to configure filters. In an additional embodiment, the filters may comprise a combination of one or more of a list of HTML elements, XPath instructions, and regex instructions in combination.

Returning now to block 708 of FIG. 7, the elements of the HTML page are traversed from parent to child until a leaf node is found and then the leaf nodes of the last parent node of the tree structure are processed. At block 710 if the node is not the last leaf node, the previously traversed leaf nodes are inspected for a pattern at block 716. A pattern is detected if a series of leaf nodes forms a consecutive repeating pattern. For example, given a series of nodes A, B, C, A, B, C, a pattern of repeating A, B, C nodes is detected. In another example, given a series of leaf nodes A, B, C, D, A, B no pattern would be detected because although nodes A and B repeat in the pattern they are not consecutive. These examples of pattern detection are for illustrative purposes only and are not meant to be limiting. In an embodiment any pattern detection process may be used to detect patterns in leaf nodes.

Returning to block 716 of FIG. 7, if a pattern is detected the leaf nodes are reduced at block 718. Returning to the previous example, if the leaf nodes A, B, C, A, B, C, were processed at block 718, the leaf nodes would be reduced to eliminate the repeating pattern, the leaf nodes A, B, C, A, B, C would become for example A, B, C. In another example, given the leaf nodes D, E, D, E, G the reduction of block 718 would produce D, E, G by for example reducing the repeating leaf nodes D, E, D, E to leaf nodes D, E. Of course, these examples of pattern detection and reduction are for illustrative purposes only and are not meant to be limiting. In an embodiment any pattern detection process may be used to detect patterns in leaf nodes. Returning to block 718 of FIG. 7, once the leaf nodes are reduced the next leaf node is processed at block 720 and the steps of blocks 710, 716, 718, and 720 are repeated as described above.

Returning now to block 710, if the last leaf node has been processed for the given parent node, the entire set of leaf nodes is reduced to the parent node at block 712. In an embodiment the leaf nodes are converted to a string of text and placed as a text value of the parent node. Table 2a-2c shows one example of a parent node with child nodes throughout the reduction process blocks 710, 712, 716, and 718.

TABLE 2a

...
<Parent>
<A>
<B>
<C>
<A>
<B>
<C>
<E>
<D>
<E>
</Parent>
...

Table 2a depicts a parent node with several leaf nodes. One pattern is detected <A><B><C>. These leaf nodes are reduced through several iterations of block 718 eventually creating the parent and leaf nodes of Table 2b.

TABLE 2b

...
<Parent>
<A>
<B>
<C>
<E>
<D>
<E>
</Parent>
...

Table 2b depicts a parent node once the last reduction step for the leaf nodes has been performed. The original set of nine leaf nodes of Table 2a is now reduced to six leaf nodes. These leaf nodes are reduced to the parent node as text at block 712 as depicted in Table 2c.

TABLE 2c

...
<Parent><A><B><C><E><D><E></Parent>
...

Table 2c depicts a single parent node containing the text "<A><B><C><E><D><E>" and no leaf elements. Note that the parent element has now become a leaf node of its parent (not shown) because it no longer contains child nodes. The examples of Tables 2a-2c are examples for illustrative purposes and are not meant to be limiting in any way. It will be understood that any number or pattern of child elements may be reduced without impacting the efficacy of the invention.

Returning now to block 714 of FIG. 7, once all of the leaf nodes of a parent node have been reduced, if there are additional parent nodes, the processing continues on the next parent node in the tree structure at block 708. The processing blocks 708-712 and 716-720 are repeated until all of the leaf elements have been reduced to text patterns in the parent nodes and there is only a single root node (also referred to herein as the last parent node) with one text element and no child nodes. At block 714, if there are no more parent nodes to process, a unique page identifier is generated at block 722.

The unique page identifier may be created by any method of processing the last parent node into an identifier (ID) that can be repeated by subsequent processing of the same parent node such that when the page is processed a second time the same unique ID is produced. In an embodiment the last parent node is processed using a hashing algorithm as is known in the art to produce a hash string as is known in the art. The hashing algorithm is a set of instructions that create the same compressed string from a longer strong of text, such that a hashing algorithm processing of character string X will always produce hash string Y. In an alternate embodiment, the text value of the last parent node will be used as the unique key. The embodiments listed herein are some examples of a number of possible ways of generating a unique ID from the last parent node and are not meant to be limiting.

It will be understood that the process blocks of FIG. 7 produce a unique ID that may be independent of the visual content of a web page, such as, for example, the text or images on the page. The unique ID may also be independent of the menu items of the page, the advertisements, or any other content specific elements of the page. It will be understood that by modifying the configuration settings stored in the storage device 110 and/or 212 a user of the system 100 and/or 200 may configure which page elements become part of the unique ID of the page and as a result determine the fidelity of the DOM based page uniqueness detection.

Figure 8:
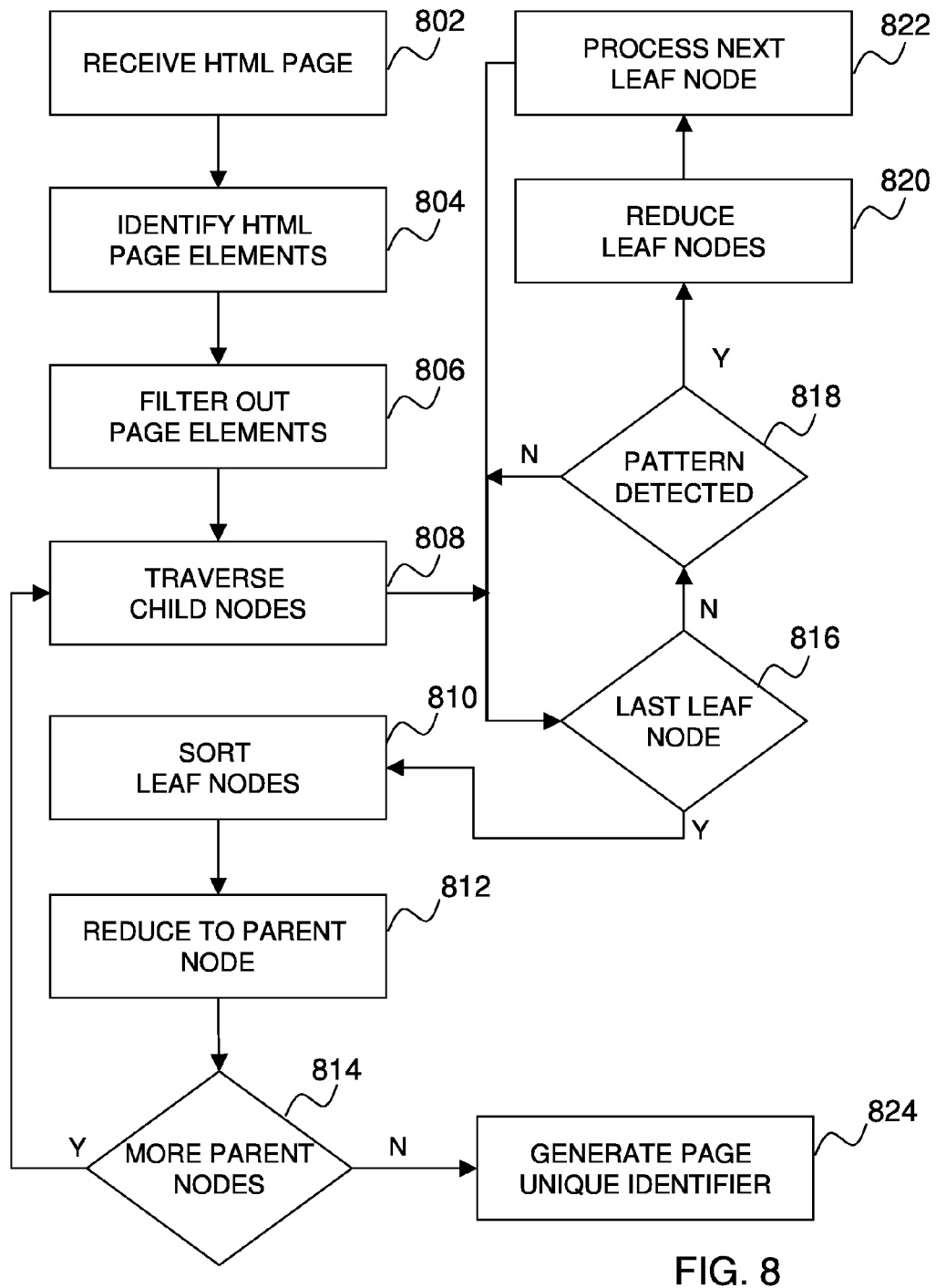
FIG. 8 depicts a detailed block diagram of an embodiment of the disclosure.

FIG. 8 depicts a process flow that may implement by the web indexing application 112 executing on the host system 202 or web indexing application logic 104 in an additional embodiment of the current invention. At block 802 the web indexing application 112 receives an HTML page from the webserver 302 of FIG. 2. The HTML page may be in the form of a static HTML page, or a Web 2.0 HTML page (e.g. FIGS. 4-6) with embedded Javascript. At block 804 the HTML is parsed (i.e. the HTML page elements 308 are read and interpreted) and all of the page elements 308 are identified and stored in memory while retaining their original layout and order. At block 806 the page elements 308 which are not significant are filtered out. In an embodiment the filtered page elements 308 are removed from memory. In alternate embodiments the filtered page elements are left in memory but ignored in future processing steps.

The elements to be filtered are configured by configuration settings stored in the storage device 110 and/or 212 as filters. In an embodiment the filters comprise a list of HTML nodes (e.g. img, a) that are to be filtered. In one embodiment, a series of filters may be used to exclude some elements while including others. For example, a filter may be configured to eliminate all <li> nodes while a second filter may be created to include all <li> nodes which contain an attribute "important." By using both exclusive filters and inclusive filters all <li> nodes may be excluded except for <li> nodes with the attribute of "important." The filters may comprise a list of element names, and/or one or more XML Path Language (XPath) instructions. The XPath instructions comprise one or more strings of instructions indicating a particular HTML node by node name, attribute name, attribute value, or HTML element value including display text within the HTML page. The XPath command may be used to explicitly exclude particular segments of the HTML as is known in the art. In addition, the filters may comprise regular expression (regex) instructions as is known in the art. Regex instruction provide the text parsing and filtering capabilities which may be used to filter the HTML page by text and/or wildcard strings as is known in the art. Of course any other method of identifying elements to be excluded or included as is known in the art may be used to configure filters. In an additional embodiment, the filters may comprise a combination of one or more of a list of HTML elements, XPath instructions, and regex instructions in combination.

Returning now to block 808 of FIG. 8, the elements of the HTML page are traversed from parent to child until a leaf node is found and then the leaf nodes of the last parent in the tree structure are processed. At block 816 if the node is not the last leaf node, the previously traversed leaf nodes are inspected for a pattern at block 818. A pattern is detected if a series of leaf nodes forms a consecutive repeating pattern. For example, given a series of nodes A, B, C, A, B, C, a pattern of repeating A, B, C nodes is detected. In another example, given a series of leaf nodes A, B, C, D, A, B no pattern would be detected because although nodes A and B repeat in the pattern they are not consecutive. These examples of pattern detection are for illustrative purposes only and are not meant to be limiting. In an embodiment any pattern detection process may be used to detect patterns in leaf nodes.

Returning to block 818 of FIG. 8, if a pattern is detected the leaf nodes are reduced at block 820. Returning to the previous example, if the leaf nodes A, B, C, A, B, C, were processed at block 820, the leaf nodes would be reduced to eliminate the repeating pattern, the leaf nodes A, B, C, A, B, C would become for example A, B, C. In another example, given the leaf nodes D, E, D, E, G the reduction of block 820 would produce D, E, G by for example reducing the repeating leaf nodes D, E, D, E to leaf nodes D, E. Of course, these examples of pattern detection and reduction are for illustrative purposes only and are not meant to be limiting. In an embodiment any pattern detection process may be used to detect patterns in leaf nodes. Returning to block 820 of FIG. 8, once the leaf nodes are reduced the next leaf node is processed at block 822 and the steps of blocks 816, 818, 820, and 822 are repeated as described above.

Returning now to block 816, if the last leaf node has been processed for the given parent node, the entire set of leaf nodes is sorted at block 810. The leaf nodes are sorted in order to neutralize differences in a page based on the same elements being rearranged on the page such as those depicted in FIGS. 5 and 6 as described above. The sorting of leaf nodes is illustrated below in tables 3a-3b.

TABLE 3a

...
<Parent>
　<A>
　<B>
　<C>

TABLE 3a-continued

</Parent>
...

Table 3a depicts a set of nodes representing a series of page elements 308 <A>, <B> and <C>. These elements may be, for example, a series of paragraphs on an html page (eg. FIG. 5). In one example, the elements may be arranged in the page in a different order (e.g. FIG. 6) such as, for example, the order depicted in Table 3b.

TABLE 3b

...
<Parent>
<C>
<A>
<B>
</Parent>
...

Table 3b depicts the same nodes arranged in a different order. Sorting the leaf nodes of Table 3b results in the order of Table 3c.

TABLE 3c

...
<Parent>
<A>
<B>
<C>
</Parent>
...

Note that the leaf nodes of Table 3c are the in the same order as Table 3a. By sorting the leaf elements two pages with the same page elements 308 ordered differently may be indexed as the same page.

Returning now to block 812 of FIG. 8, once all of the leaf nodes are sorted the entire set of leaf nodes is reduced to the parent node. In an embodiment the leaf nodes are converted to a string of text and placed as a text value of the parent node. Table 4a-4c shows one example of a parent node with child nodes throughout the reduction process blocks 810, 816, 818, 820, and 822.

TABLE 4a

...
<Parent>
<A>
<B>
<C>
<A>
<B>
<C>
<E>
<D>
<E>
</Parent>
...

Table 4a depicts a parent node with several leaf nodes. The leaf nodes are reduced at block 820 resulting in the parent and leaf nodes depicted in Table 4b.

TABLE 4b

...
<Parent>
<A>
<B>
<C>
<E>
<D>
<E>
</Parent>
...

One pattern was detected <A>, <B>, <C>. These leaf nodes are now sorted at block 810 resulting in the parent and leaf nodes of Table 4c.

TABLE 4c

...
<Parent>
<A>
<B>
<C>
<D>
<E>
<E>
</Parent>
...

Table 4c depicts a parent node once the sorting step for the leaf nodes has been performed. The original set of nine leaf nodes of Table 4a is now reduced to six sorted leaf nodes. These leaf nodes are reduced to the parent node as text at block 812 as depicted in Table 4d.

TABLE 4d

...
<Parent><A><B><C><D><E><E></Parent>
...

Table 4c depicts a single parent node containing the text "<A><B><C><D><E><E>" and no leaf elements. Note that the parent element has now become a leaf node of its parent (not shown) because it no longer contains child nodes. The examples of Tables 4a-4d are examples for illustrative purposes and are not meant to be limiting in any way. It will be understood that any number or pattern of child elements may be reduced without impacting the efficacy of the invention.

Returning now to block 814 of FIG. 8, once all of the leaf nodes of a parent node have been reduced, if there are additional parent nodes, the processing continues on the next parent node in the tree structure at block 808. The processing blocks 808-812 and 816-822 are repeated until all of the leaf elements have been reduced to text patterns in the parent nodes and there is only a single root node (also referred to herein as the last parent node) with one text element and no child nodes. At block 814, if there are no more parent nodes to process, a unique page identifier is generated at block 824.

The unique page identifier may be created by any method of processing the last parent node into an ID that can be repeated by subsequent processing of the same parent node such that when the page is processed a second time the same unique ID is produced. In an embodiment the last parent node is processed using a hashing algorithm as is known in the art to produce a hash string as is known in the art. The hashing algorithm is a set of instructions that create the same compressed string from a longer strong of text, such that a hashing algorithm processing of character string X will always produce hash string Y. In an alternate embodiment, the text value of the last parent node will be used as the unique key. The embodiments listed herein are some examples of a number of possible ways of generating a unique ID from the last parent node and is not meant to be limiting.

It will be understood that the process blocks of FIG. 8 produce a unique ID that may be independent of the visual content of a web page 306, such as, for example, the text or images on the page. The unique ID may also be independent of the arrangement of the elements on a page, the menu items of the page, the advertisements, or any other content specific elements of the page. It will be understood the by modifying the configuration settings stored in the storage device 110 and/or 212 a user of the system may configure which page elements 308 become part of the unique ID of the page and as a result determine the fidelity of the DOM based page uniqueness detection.

Technical effects and benefits include providing the capability detecting the uniqueness of DOM based web pages 306 even when the page content and order of page elements 308 changes dynamically over time. The uniqueness is determined by reducing all of the elements of a page to a single element in a reproducible way. The reduction may generate the same single element for a page even if the items on the page are in different locations on the page.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the FIGS. 1-8 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
receiving a hypertext markup language (HTML) page at a computer;
identifying HTML page elements in response to the receiving, the HTML page elements comprising parent nodes, the parent nodes comprising child nodes;
processing each of the HTML page elements, the processing comprising:
grouping the child nodes by parent node into a group of child nodes;
detecting patterns in the group of child nodes in response to the grouping;
reducing the group of child nodes to text strings in response to the detecting; and
storing the text strings as text values in the parent nodes;
wherein the processing of each of the HTML page elements results in the HTML page elements being expressed as a single root node, said single root node comprising a single text string, which includes text patterns in parent nodes for each of the child nodes; and
in response to the processing, generating a unique identifier (ID) of the HTML page from the single root node and the single text string, wherein the generating is performed in a repeatable manner such that subsequent processing of the same single root node and the single text string produces the same unique identifier.

2. The method of claim 1, wherein the processing further comprises sorting the group of child nodes in response to the reducing.

3. The method of claim 2, wherein the HTML page comprises a visible page, the visible page comprising moveable HTML page elements, the moveable HTML page elements configured to occupy any location on the visible page, and the unique ID of the HTML page is the same for all locations of the moveable HTML page elements on the visible page.

4. The method of claim 1, wherein the HTML page comprises content being generated dynamically.

5. The method of claim 1, wherein the HTML page comprises a uniform resource locator (URL), and the unique ID of the HTML page is the same for a plurality of HTML pages, the plurality of HTML pages each comprising a different URL.

6. The method of claim 1, further comprising filtering HTML page elements in response to the identifying, the filtering removing the child nodes and the parent nodes that meet filter criteria, the filter criteria comprising one or more of:
extensible markup language path language instructions;
regular expression instructions; and
a list of html nodes.

7. The method of claim 1, wherein the unique identifier is independent of menu items, advertisements, or any other content specific elements of the HTML page.

8. The method of claim 1, wherein the unique identifier is independent of visual content of the HTML page.

9. A method comprising:
receiving a webpage at a computer;
identifying page elements in response to the receiving, the page elements comprising parent nodes, the parent nodes comprising child nodes;
processing each of the page elements to express the page elements as a single root node, said single root node comprising a single text string, which includes text patterns in parent nodes for each of the child nodes; and
generating a unique identifier of the webpage in response to the processing, wherein the unique identifier is not same as a uniform resource locator of the webpage from the single root node and the single text string, wherein the generating is performed in a repeatable manner such that subsequent processing of the same single root node and the single text string produces the same unique identifier.

10. The method of claim 9, further comprising sorting the group of child nodes in response to the reducing.

11. The method of claim 9, wherein the webpage comprises content being generated dynamically.

12. The method of claim 11, wherein the webpage comprises a visible page, the visible page comprising moveable page elements, the moveable page elements configured to occupy any location on the visible page, and the unique identifier of the webpage is the same for all locations of the moveable page elements on the visible page.

13. The method of claim 9, wherein the webpage comprises the uniform resource locator, and the unique identifier of the webpage is the same for a plurality of webpages, the plurality of webpages each comprising a different uniform resource locator.

14. The method of claim 9, further comprising filtering the page elements in response to the identifying, the filtering removing the child nodes and the parent nodes that meet filter criteria, the filter criteria comprising one or more of:
extensible markup language path language instructions;
regular expression instructions; and
a list of html nodes.

15. A computer program product comprising a non-transitory computer readable storage medium having computer usable program code digitally encoded therewith, the computer usable program code comprising:
computer usable program code stored in a non-transitory storage medium operable to receive a hypertext markup language (HTML) page at a computer;
computer usable program code stored in a non-transitory storage medium operable to identify HTML page elements in response to the receiving, the HTML page elements comprising parent nodes, the parent nodes comprising child nodes;
computer usable program code stored in a non-transitory storage medium operable to process each of the HTML page elements, the processing comprising:
grouping the child nodes by parent node into a group of child nodes;
detecting patterns in the group of child nodes in response to the grouping;
reducing the group of child nodes to text strings in response to the detecting; and
storing the text strings as text values in the parent nodes;
wherein execution of the computer usable code to process of each of the HTML page elements results in the HTML page elements being expressed as a single root node, said single root node comprising a single text string, which includes text patterns in parent nodes for each of the child nodes; and
computer usable program code stored in a non-transitory storage medium operable to generate, in response to the processing, a unique identifier of the HTML page from the single root node and the single text string, wherein the generating is performed in a repeatable manner such that subsequent processing of the same single root node and the single text string produces the same unique identifier.

16. The computer program product of claim 15, wherein the processing further comprises sorting the group of child nodes in response to the reducing.

17. The computer program product of claim 15, wherein the HTML page comprises content being generated dynamically.

18. The computer program product of claim 17, wherein the HTML page comprises a visible page, the visible page comprising moveable HTML page elements, the moveable HTML page elements configured to occupy any location on the visible page, and the unique ID of the HTML page is the same for all locations of the moveable HTML page elements on the visible page.

19. The computer program product of claim 15, wherein the HTML page comprises a uniform resource locator, and the unique identifier of the HTML page is the same for a plurality of HTML pages, the plurality of HTML pages each comprising a different uniform resource locator.

20. The computer program product of claim 15, further comprising computer usable program code stored in a non-transitory storage medium operable to filter HTML page elements in response to the identifying, the filtering removing the child nodes and the parent nodes that meet filter criteria, the filter criteria comprising one or more of:
extensible markup language path language instructions;
regular expression instructions; and
a list of html nodes.

* * * * *